United States Patent
Ma et al.

(10) Patent No.: US 11,436,004 B2
(45) Date of Patent: Sep. 6, 2022

(54) CALCULATING A PATCH TARGET ON AN APPLICATION SERVER

(71) Applicant: RED HAT, INC., Raleigh, NC (US)

(72) Inventors: Er Qiang Ma, Beijing (CN); Alessio Soldano, Milan (IT)

(73) Assignee: Red Hat, Inc., Raleigh, NC (US)

( * ) Notice: Subject to any disclaimer, the term of this patent is extended or adjusted under 35 U.S.C. 154(b) by 61 days.

(21) Appl. No.: 16/856,822

(22) Filed: Apr. 23, 2020

(65) Prior Publication Data
US 2021/0334088 A1  Oct. 28, 2021

(51) Int. Cl.
| | |
|---|---|
| G06F 9/445 | (2018.01) |
| G06F 9/44 | (2018.01) |
| G06F 11/00 | (2006.01) |
| G06F 8/658 | (2018.01) |
| H04L 67/00 | (2022.01) |
| H04L 67/025 | (2022.01) |
| G06F 8/61 | (2018.01) |

(52) U.S. Cl.
CPC .............. *G06F 8/658* (2018.02); *G06F 8/61* (2013.01); *H04L 67/025* (2013.01); *H04L 67/34* (2013.01)

(58) Field of Classification Search
CPC ............ G06F 21/604; G06F 16/2228; G06F 16/2246; G06F 16/23; G06F 16/316; G06F 11/3065; G06F 16/9574; G06F 11/3433; G06F 2201/81; G06F 2201/815; G06F 8/65; G06Q 30/02; H04L 63/08; H04L 63/10; H04L 63/105; H04L 67/42; H04L 67/02; H04L 67/2842; H04L 67/2814; H04L 67/2852; H04L 29/06027; H04L 51/04; H04N 21/812; H04N 21/8126; H04N 21/84
See application file for complete search history.

(56) References Cited

U.S. PATENT DOCUMENTS

| | | | |
|---|---|---|---|
| 6,829,600 B2 * | 12/2004 | Gu | G06F 16/24537 707/809 |
| 9,787,579 B2 * | 10/2017 | Khakpour | H04L 45/306 |
| 2010/0083245 A1 * | 4/2010 | DeHaan | G06F 9/4411 717/177 |
| 2013/0019314 A1 | 1/2013 | Ji et al. | |

(Continued)

FOREIGN PATENT DOCUMENTS

| | | |
|---|---|---|
| CN | 102402438 | 7/2014 |
| WO | 2016049376 | 3/2016 |

OTHER PUBLICATIONS

Oracle Corp., Oracle Cloud—Accessing Business Objects Using REST APIs, 118 pages (Year: 2019).*

(Continued)

*Primary Examiner* — Thuy Dao
(74) *Attorney, Agent, or Firm* — Womble Bond Dickinson (US) LLP (57) ABSTRACT

A method includes receiving, at an application server, a request to modify a target object, such as a resource object. The method further includes identifying, from the request, a first parameter and a second parameter and assigning the first parameter to a first variable and the second parameter to a second variable. The method then executes an operation to calculate the target object in view of the first and second variables.

20 Claims, 6 Drawing Sheets

(56) References Cited

U.S. PATENT DOCUMENTS

| | | | |
|---|---|---|---|
| 2013/0198613 A1* | 8/2013 | Scoda | G06F 40/154 |
| | | | 715/239 |
| 2017/0257439 A1* | 9/2017 | Wang | H04W 48/08 |
| 2018/0336190 A1* | 11/2018 | Ishida | G06F 40/47 |
| 2018/0349405 A1 | 12/2018 | Augustine et al. | |

OTHER PUBLICATIONS

Red Hat Inc., Installing and configuring Decision Server on IBM WebSphere Application Server, 29 pages (Year: 2018).*

Başaranoğlu, C. (Jan. 25, 2019). "'You Know Nothing, Engineers'—HTTP [Patch]" dowloaded from https://medium.com/hepsiburadatech/you-know-nothing-engineers-http-patch-d2ebab99dd5, 9 pages.

"JSON Patch and JSON Merge Patch" (May 14, 2016), downloaded from https://erosb.github.io/post/json-patch-vs-merge-patch/, 5 pages.

Cao, H. et al. (2016). "JSON Patch for Turning a Pull REST API Into a Push", University of Bordeaux, LaBRI, France; Beihang University, Beijing, China, 15 pages.

* cited by examiner

Patch Request 510

| Headers 512 | Values 514 |
|---|---|
| URL | PATCH /StudentPatch/students/1 HTTP/1.1 |
| Content-Type | application/json-patch+json |
| Content-Length | 46 |
| Host | 8080 |
| Patch-target-method | GET |
| Patch-target-path | /StudentPatch/anotherviewstudents/1 |
| Connection | Keep-Alive |
| User-Agent | Apache-HttpClient/4.5.10 (Java/1.8.0_152) |

Patch Operation 516

[{"op":"add", "path": "/gender", "value" : "male"}]

FIG. 5A

Sub-Resource Locator 520

@Path("students")

```
Public class StudentsLocator{
@Path("{id}")
public Student locate(@PathParam("id") int id){
        return new StudentResource();
}
```

```
Public class StudentResource{
@GET
@Produces(MediaType.APPLICATION_JSON)
public String Student(){
        return "{name: student1}"
}
```

CALCULATING A PATCH TARGET ON AN APPLICATION SERVER

TECHNICAL FIELD

Aspects of the present disclosure relate to network policies in virtual environments, and more particularly, calculating a patch target on an application server.

BACKGROUND

An application server may store script for executing applications, resource files used by the applications, and other files used for operation of the application server. Resource files stored on the application server may occasionally be updated by a user, or administrator, of a client device. A hyper-text transfer protocol (HTTP) request may be sent from the client device to the application server to update, or modify, a resource file on the application server.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

When an application server receives a java-script object notation (JSON) patch, or other type of resource file patch, (e.g., via an HTTP request) the server must first locate the patch target (i.e., the resource object to apply the patch to) and then apply the patch to the target object. Conventionally, for the HTTP patch request, the HTTP verb PATCH is included as the HTTP method and a patch target resource is included as the uniform resource identifier (URI). However, performing the patch request in this manner is inflexible. The patch target can only be calculated by this fixed pattern method and a user cannot modify how the patch target is found. For example, the user may want to query the patch target from a different uniform resource locator (URL) or using a different HTTP method. Additionally, this fixed manner of locating the patch target fails under certain circumstances. For example, an error may result if the URI path returns a mismatched object type (e.g., not a JSON object), if there is no corresponding GET operation in the URI resource, or if the URI includes a sub-resource locator (e.g., JAXRS sub-resource locator).

Aspects of the disclosure address the above-noted and other deficiencies by providing a process for calculating a patch target on an application server. In particular, additional headers may be included in the HTTP request received by the application server from a client device. The headers in the request may include a patch-target method and a patch-target path. Therefore, when an application server receives an HTTP patch request, the server may first check the HTTP request header to determine if the patch target method and patch target path are defined. If patch target method is defined in the headers, then the value of the patch target method header is assigned to a first variable. If patch target path is defined in the headers, then the value of the patch target path header is assigned to a second variable. The first and second variables (e.g., the patch target method and the patch target path) may then be used to calculate the target object.

In one example, if either the patch target method or patch target is not defined in the HTTP request headers, the server may query a micro-profile configuration associated with the URI of the patch request. Again, if the micro-profile configuration includes the patch target method then the value will be assigned to the first variable. If the micro-profile configuration includes the patch target path, then the value will be assigned to the second variable. Finally, if the patch target method or patch target path is not defined in the headers or the micro-profile configuration, then a default value may be assigned to the first and second variables. For example, if the patch target method is not found in the headers or in the MP configuration then the method "GET" may be assigned to the first variable by default. Similarly, if the patch target method is not found in the headers or MP configuration then the URI included in the HTTP patch request may be assigned to the second variable.

Furthermore, once the first and second variables are assigned a value, processing logic may identify a resource method using the first and second variables. The resource method may be a method defined at the server to access and/or manage resources of the server. The processing logic may then use the identified resource method to calculate the patch target object. Once the patch target object is calculated using the identified resource method, the server may apply the patch to the patch target. However, if the method is not defined or does not exist, then an error message may be generated. Therefore, the presently disclosed method is more flexible and user friendly than previous approaches, allowing a user to define how the patch target is located. The method also calculates the target object more quickly by using the patch target path and method resulting in the patch being applied more quickly. Additionally, the method has better error handling because either the resource method is found using the first and second variables and the target object is calculated or the resource method is not found and an error indicating that the target object cannot be found is generated.

Figure 1:
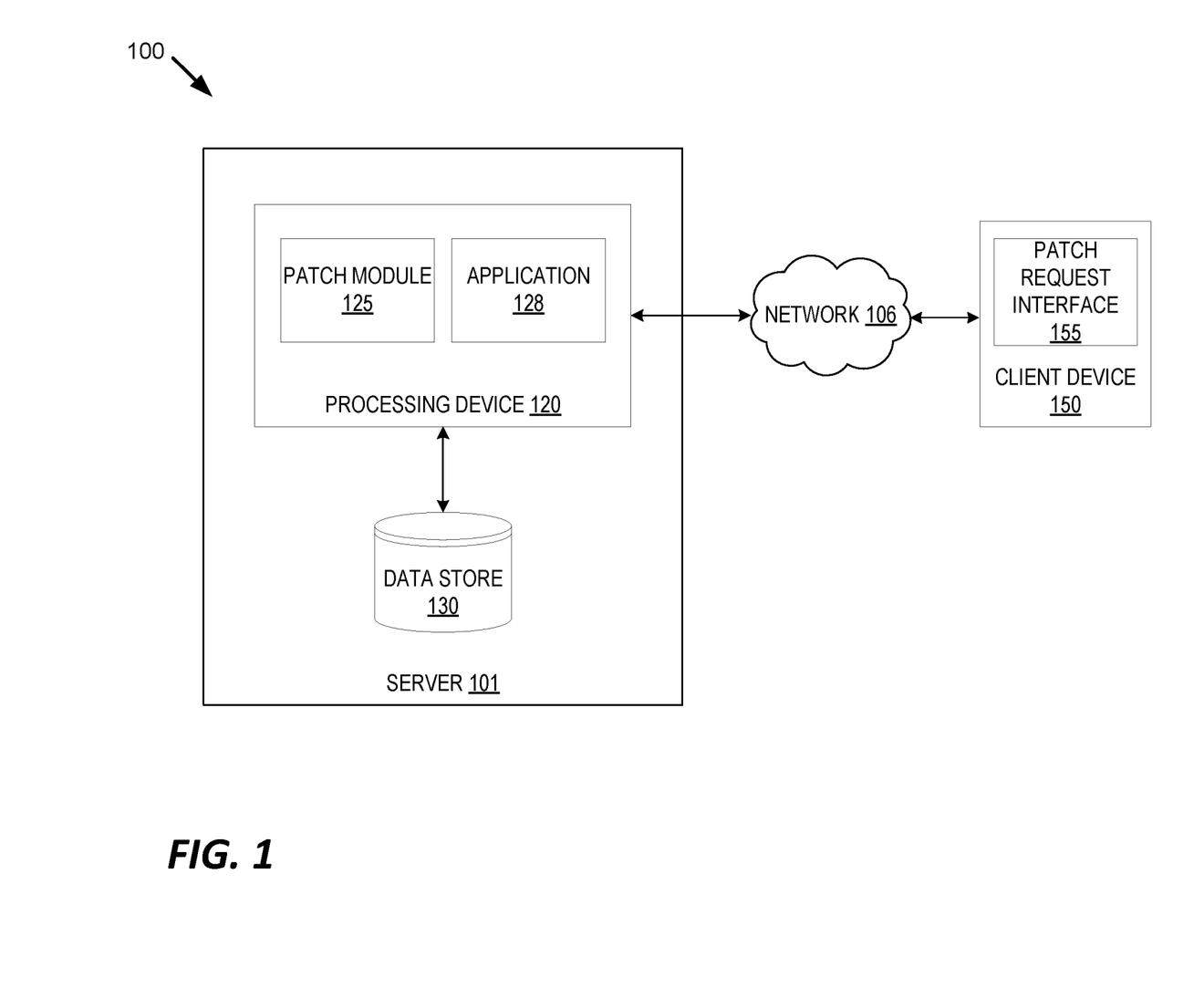
FIG. 1 is a system diagram that illustrates an example system for calculating a merge or patch target object from a resource file location in a server, in accordance with some embodiments.

FIG. 1 is a block diagram that illustrates an example of a system 100 for calculating a target object in accordance with embodiments of the disclosure. The system 100 may include a server 101 and a client device 150 connected by a network 106. Network 106 may be any type of network such as a public network (e.g., the Internet), a private network (e.g., a local area network (LAN), Wi-Fi, or a wide area network (WAN)), or a combination thereof. Client device 150 may be any data processing device, such as a desktop computer, a laptop computer, a mainframe computer, a personal digital assistant, a rack-mount server, a hand-held device or any other device configured to process data. Client device 150 may include a patch request interface 155. Patch request interface 155 may be an application programming interface API, graphical user interface (GUI), or other interface that a user or an application may use to send an HTTP request to server 101 to patch, merger, or otherwise modify resources stored at server 101. In particular, the patch request interface 155 may send an HTTP request to patch module 125 of the server 101 to patch a resource object stored at data store 130. Patching a resource object and/or a resource file may include applying a set of changes described in the request to a particular resource (e.g., object or resource file), the location of which may be calculated based on methods described herein.

Server 101 may be any type of server, such as an application server, a web server, an FTP server, or any other type of server with which a user device can communicate. Server 101 may include a processing device 120 executing one or more applications 128 and a patch module 125. The applications 128 may include any type of web applications, server applications, or any other software stored on a network connected server. Patch module 125 may receive an HTTP patch request from the patch request interface 155 of client device 150 and initiate the patch (or merge, or other modification) for a target object. In one example, the patch module 125 may identify a patch-target method and a patch-target path from the HTTP request headers. The patch target method may identify the method defined on the server to calculate the patch target object. For example, the patch target method may identify a resource method, such as a java method, on the server that is to calculate the location of the patch target. The patch-target path may be a path that is to be used by the method identified by patch-target method to find the location of the patch target object. In one example, the patch-target path may be a path to the target object relative to the URI provided in the HTTP patch request.

The patch request interface 155 may add the patch-target method and patch-target path headers to the HTTP request according to a user's preference, by default, according to the type of object to be patched, or in any other manner. The patch module 125 may then calculate a patch target object that is to be patched based on the patch-target method and the patch-target path values retrieved from the HTTP request headers. In one example, the HTTP request header may not include one or both of the patch-target method, or the patch-target path. In such a case, the patch module 125 may query a micro-profile configuration (e.g., stored in data store 130) in attempt to obtain the patch-target method or patch-target path that was missing from the HTTP request header. A micro-profile configuration may be a configuration file storing configuration parameters associated with servers and micro-services of the server. For example, the micro-profile configuration may include information and configuration data used during execution of the server or micro-services it describes. However, if neither the HTTP request headers or the micro-profile configuration include the patch-target method then a default value will be used instead. For example, a GET method may be used as a default if the patch-target method is otherwise not defined by the request headers or the micro-profile configuration.

Once the target object is calculated using the identified resource method, or resource function, the patch module 125 may further apply the patch to the target object. For example, the patch module 125 may modify the target object by adding or deleting items and/or portions of the object according to the patch document, or patch instructions, received from the patch request. The patch module 125 may include a separate function defined to perform the patch. Alternatively, the patch may also be any other operation to modify an object or resource file such as a merge, delete, and so forth.

Figure 2:
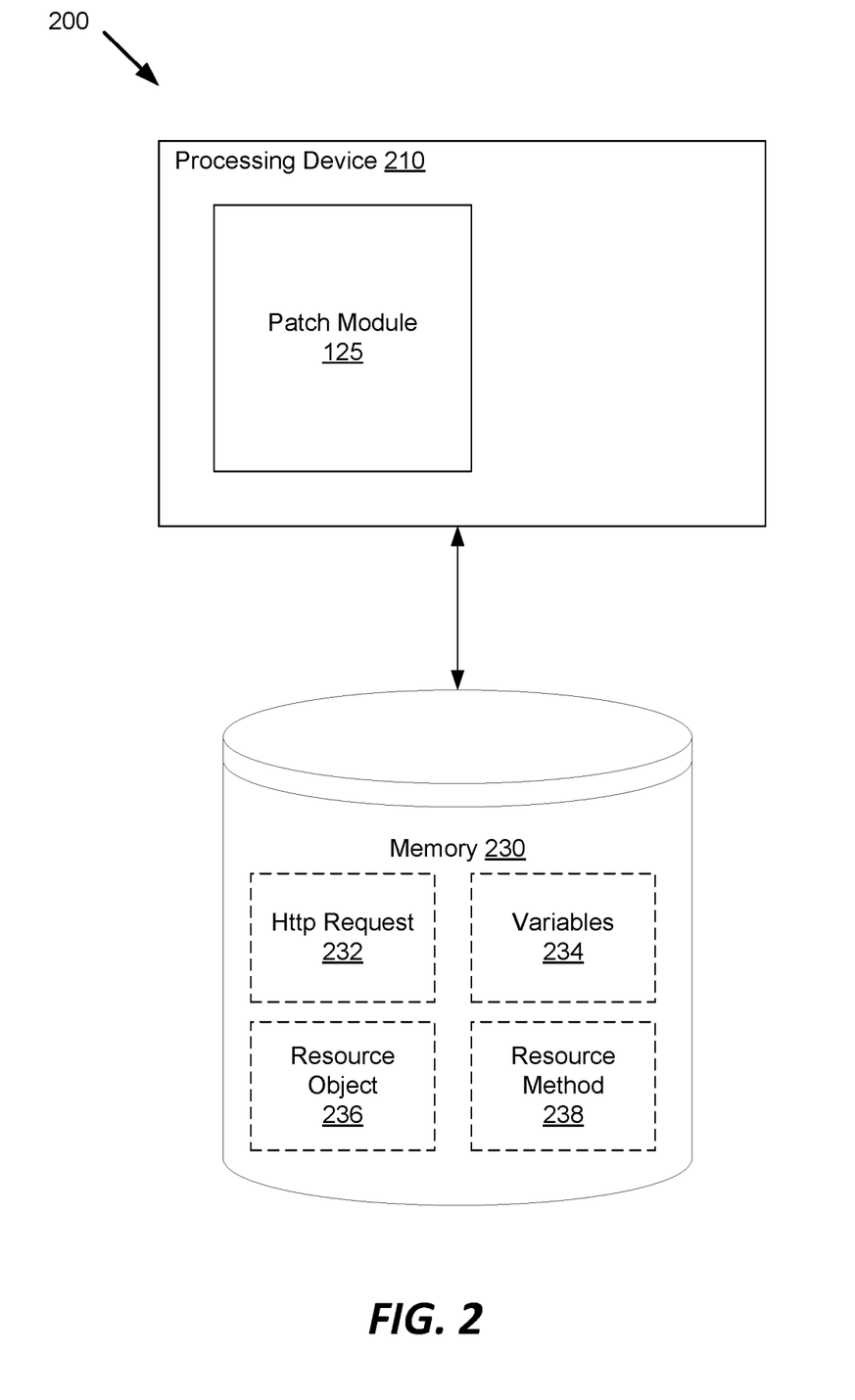
FIG. 2 is a block diagram that illustrates another example of a system for calculating a merge or patch target object location in a server in accordance with embodiments of the disclosure.

FIG. 2 is a block diagram that illustrates another example system 200 for calculating a patch object target in accordance with embodiments of the disclosure. System 200 includes a processing device 210 operatively coupled to a memory 230. The processing device 210 may include a patch module 125 for calculating a target object and performing an operation on the target object. The patch module 125 may receive an HTTP request 232 to patch, merge, or otherwise modify a resource object 236. The patch module 125 may identify one or more parameters from the HTTP request 232 to be saved as variables 234. The patch module 125 may use the variables 234 to identify and execute a resource method 238 to calculate the location of the resource object 236. The resource object 236 may be a JSON file, an XML, file, a string object, or other resource object or resource object file format.

The HTTP request 232 may include an HTTP payload. The HTTP payload may include a URL, a patch target method, a patch target path, and numerous other headers providing information and context for the request. Additionally, the HTTP payload may include a patch document to be used to patch (or modify) the target resource object 236. In one embodiment, the HTTP request 232 may not include the appropriate variables in the headers of the request. In such a case, the patch module 125 may query a micro-profile configuration to obtain the appropriate parameters. Otherwise, default values of the parameters may be assigned to the variables 234.

Once the target object is calculated using the identified resource method 238, the patch module 125 may further apply the patch to the target resource object 236. For example, the patch module 125 may modify the target resource object 236 by adding or deleting items and/or portions of the object according to a patch document, or patch instructions, received from the HTTP request 232. The patch module 125 may include a separate function defined to perform the patch of the target resource object 236. The patch may also be any other operation to modify an object or resource file such as a merge, delete, and so forth.

Figure 3:
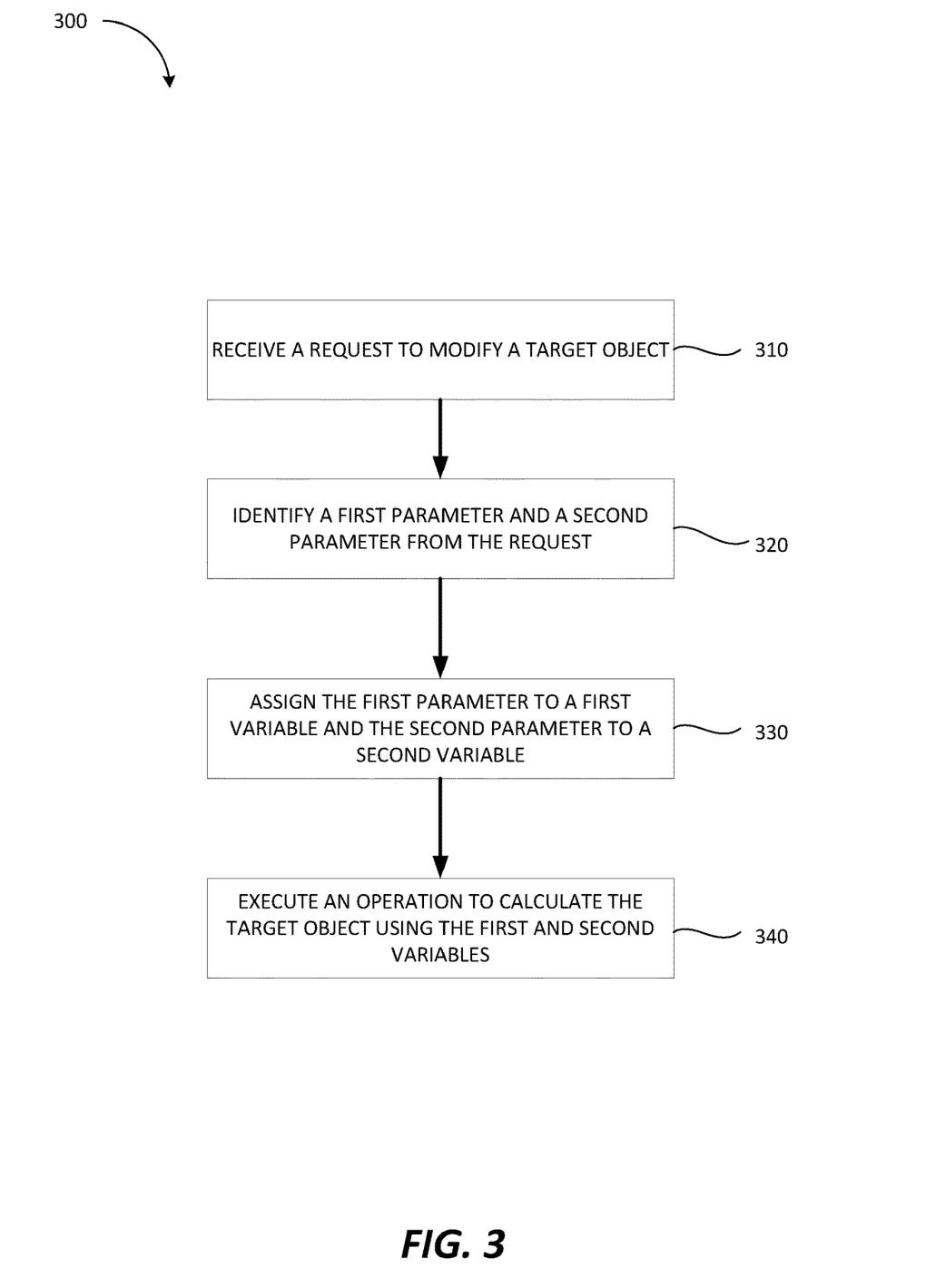
FIG. 3 is a flow diagram of a method of calculating a merge or patch target object location in a server, in accordance with some embodiments.

FIG. 3 is a flow diagram of a method 300 of virtual machine networking configuration migration, in accordance with some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 300 may be performed by a patch module 125 of FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

Method 300 begins at block 310, where the processing logic receives a request to modify a target resource object. The request may be an HTTP patch request, an HTTP JSON patch request, or other HTTP request. The target object may be a JSON file, an XML file, a string object file, or any other resource object or file. The target object may be a resource object or resource file of an application on an application server.

Figure 5A:
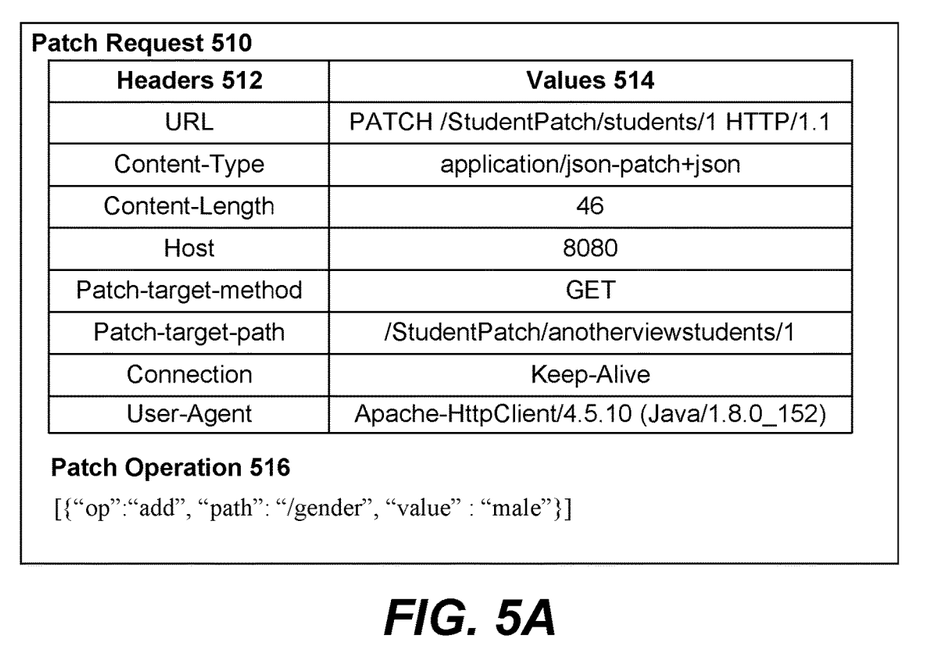
FIG. 5A depicts an example patch request in accordance with some embodiments.

At block 320, the processing logic identifies a first and second parameter from the request. In one example, the first parameter is a patch target method which identifies a method to be used to calculate the target object. The second parameter may be a patch target path to identify the path to the object or target object file. The path for the object identified from the patch target path may be a path for the object file relative to a URI included in the patch request or a direct path to the resource. The first and second parameters may be included as headers of the HTTP request, as depicted in FIG. 5A.

In one embodiment, if the first or second parameters are not included in the HTTP request headers, then the processing logic may determine whether the missing parameter(s) are included in a micro-profile configuration associated with the URI from the HTTP patch request. If the parameters are included in the micro-profile configuration, then the values from the micro-profile configurations may be assigned to the variables. Otherwise, if the parameters are not included in the HTTP request or the micro-profile configuration then default values of the parameters may be identified. For example, a default method of "GET" may be identified as the first variable (patch target method) and the URI from the http patch request may be identified as the second variable (patch target path).

At block 330, the processing logic assigns the first parameter to a first variable and the second parameter to a second variable. The processing logic may store the first and second variables to be used below at block 340. At block 340, the processing logic executes a resource method to calculate the target object using the first and second variables. The processing logic may search a resource object class using the first and second variables to determine the resource method. If the processing logic finds the resource method, the processing logic may then execute the resource method to calculate the target object.

Once the target object is calculated using the identified resource method, the processing logic may further apply the patch to the target resource object. For example, the processing logic may modify the target resource object by adding or deleting items and/or portions of the object according to a patch document, or patch instructions, received from the HTTP request. The processing logic may include a separate function defined to perform the particular changes described by the patch instructions on the target resource object. The patch may also be any other operation to modify an object or resource file such as a merge, delete, and so forth. For example, any operation that includes one or more modifications to a target resource may be performed on the target object after the target object is calculated.

Figure 4:
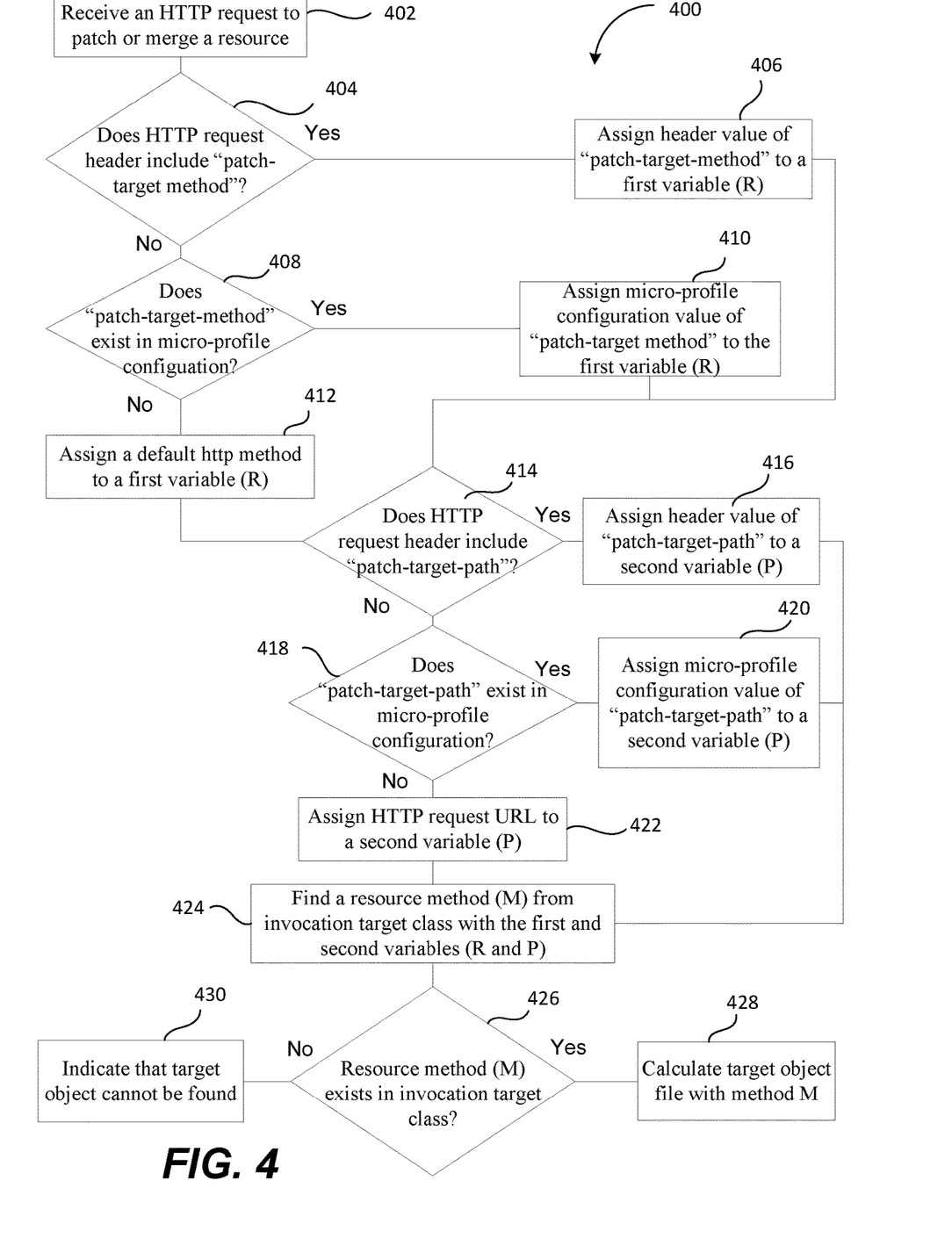
FIG. 4 is a flow diagram of another method of calculating a JSON patch target object location in accordance with some embodiments.

FIG. 4 is a flow diagram of a method 400 of virtual machine networking configuration migration, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by a patch module 125 of FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 402, where the processing logic receives a hyper-text transfer protocol (HTTP) request to perform a patch or merge on a resource object. The HTTP request may include various headers indicating parameters and information for the request. For example, the HTTP request may include a content-type of the request, a content length, etc. In addition, the headers may include a defined "patch-target method" to be used to calculate a target object location and a "patch-target path" to be used by the patch-target method in the calculation. In one example, the HTTP request may be to patch or merge a JSON file. In another example, the HTTP request may be to patch or merge an XML file, a string object, or other resource object or resource file of a server application.

At block 404, the processing logic determines whether the HTTP request header includes, or defines, "patch-target method." As mentioned above, "patch-target method" may be a method used to calculate the object location. For example, "patch-target method" may be defined as an HTTP method such as GET, POST, PUT, etc. The method defined by the "patch-target method" header of the HTTP request may then be identified, retrieved and used to calculate the target object location using additional parameters described below.

At block 406, in response to the HTTP request header including a "patch-target method," the processing logic assigns the header value of the defined "patch-target method" to a first variable. The first variable may be temporarily stored at the server to be used to calculate a location of the target object. For example, the defined "patch-target method" may be stored for use at block 424.

At block 408, in response to the HTTP request header not including a "patch-target method," the processing logic determines whether a "patch-target method" exists in a micro-profile configuration of the server application. For example, the server application may include micro-profile configurations identifying a preferred method to be used upon receiving a request to patch a resource object associated with the server application. The micro-profile may further be associated with a particular server or micro-service of the application. Thus, the micro-profile configuration may identify a preferred method for calculating a patch target resource object when a request to patch is received for the resource object associated with the application, service, or micro-service. At block 410, in response to determining that the "patch-target method" exists in the micro-profile configuration, the processing logic assigns the "patch-target method" defined by the micro-profile configuration to the first variable. At block 412, in response to determining that the "patch-target method" does not exist in the micro-profile configuration, the processing logic assigns a default HTTP method to the first variable.

At block 414, the processing logic determines whether the HTTP request headers include, or define, a "patch-target path." If included in the request, the "patch-target path" header may define a path of the target object with respect to the URL provided in the PATCH request. For example, the patch request URL may define a directory of the application server while the "patch-target path" defines a file within that particular directory.

At block 416, in response to determining that the HTTP request header includes the "patch-target path," the processing logic assigns the header value of the "patch-target path" to a second variable. At block 418, in response to determining that the HTTP request headers do not include "patch-target path," the processing logic determines whether the "patch-target path" exists in the micro-profile configuration of the server application corresponding to the directory identified in the HTTP patch request URL (i.e., the directory or resource URI). At block 420, in response to the micro-profile configuration including the "patch-target path," the processing logic assigns the micro-profile configuration value of "patch-target path" to the second variable. At block 422, in response to the "patch-target path" not existing in the micro-profile configuration, the processing logic assigns the URI from the HTTP request to the second variable.

At block 424, the processing logic identifies a resource method from an invocation target class (e.g., a method that has been pre-defined and is ready to be invoked, such as a java class) using the first and second variable. A resource method may be a method used to update, modify, create, or delete a resource on the server. For example, the resource method may be GET, PUT, POST, or other resource method. Each resource method includes the target path or the HTTP method that it should be served for (i.e., invoked for). This information may be included in the resource methods of the target class, such as in annotations of the method. By analyzing the invocation target class (e.g., by obtaining all methods of the class, such as by java reflection, and annotations in the methods), the resource method can be identified by matching the first and second variables to the path and/or HTTP method for which the methods of the invocation target class are to be invoked. The particular matched method may then be called. Thus, if the first variable (i.e., the patch-target method value) is GET, the resource method served for HTTP GET method may be invoked.

At block 426, the processing logic determines whether the identified resource method exists in the invocation target class. At block 428, in response to determine that the identified resource method exists in the invocation target class, the processing logic calculates the target object using the identified resource method. At block 430, in response to determine that the identified resource method does exist in the invocation target class, the processing logic provides an indication that the target object cannot be found.

After the target object is calculated using the identified resource method, the patch module may further apply the patch to the target resource object. For example, the patch module may modify the target resource object by adding or deleting items and/or portions of the object according to a patch document, or patch instructions, received from the HTTP request. The patch module may include a separate function defined to perform the patch of the target resource object. The patch may also be any other operation to modify an object or resource file such as a merge, delete, and so forth.

FIG. 5A depicts an example HTTP patch request 510 according to some embodiments. The patch request 510 may include a URL and numerous other headers 512 detailing information about the request. The URL may include a type of the HTTP request and a URI of a directory or resource of the server to which the request is directed. In one example, the headers 512 may also include "Content-Type," "Content-Length," "Host," "Patch-target-method," Patch-target-path," "Connection," and "User-Agent" each with a corresponding value. The patch request 510 may further include a patch operation 516 (e.g., [{"op":"add", "path": "/gender", "value": "male"}]). The patch operation 516 depicted in FIG. 5A may be a patch to add a gender field with the value of "male" to the resource object located at the Patch-target-path "/StudentPatch/anotherviewstudents/1" using Patch-target-method "GET." The "Patch-target-method" and "Patch-target-path" may be defined by a user of a client device (e.g., client device 150 of FIG. 1) an application of the client device, or any other method in which HTTP headers are defined.

Figure 5B:
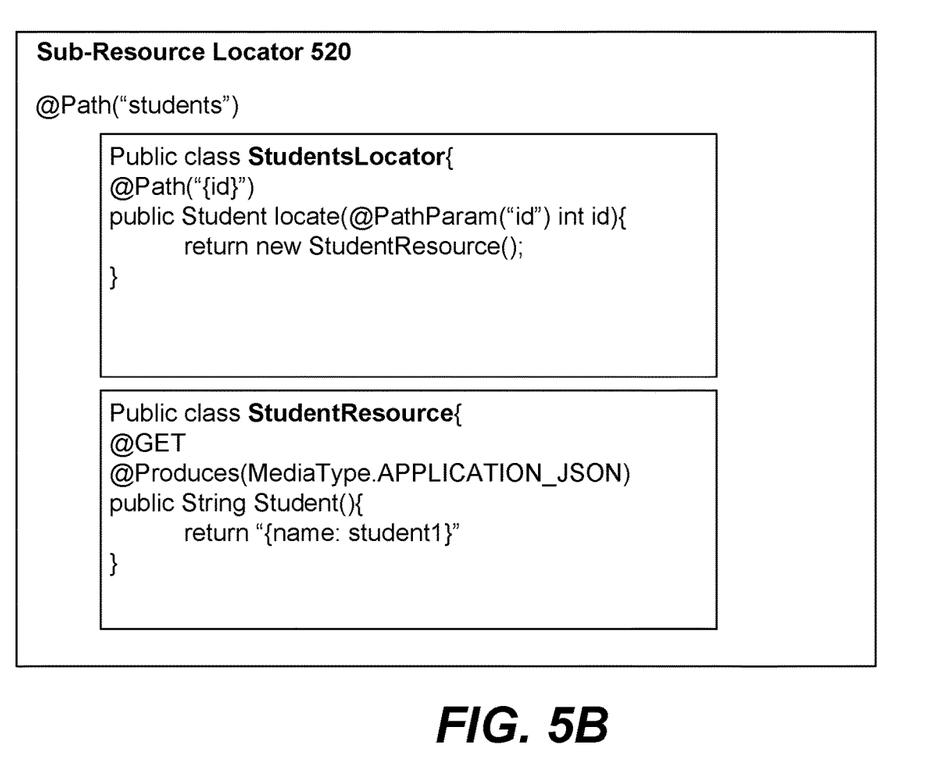
FIG. 5B depicts an example sub-resource locator method in accordance with some embodiments.

FIG. 5B depicts an example sub-resource locator 520 that may be located and executed on the server side to return a string object. When the server includes a sub-resource locator such as sub-resource 520, which returns an object other than a JSON object, the patch-target method and patch-target path, as depicted in FIG. 5A may be used to find a resource method to return a correct JSON object. The sub-resource locator 520 may be used to find and return resources located in the "students" directory (@Path("students"). In particular, the sub-resource locator 520 may include a java class "StudentsLocator" to create and return a new "StudentResource" object. The sub-resource locator 520 may further include a java class "StudentResource" to return a particular String object from an identified resource file. The operations in "StudentResource" may define the performance of the "GET" operation in response to the Patch-target-path having the value GET.

Because the target object returned by the sub-resource locator 520 is a string object instead of a JSON object as expected, the approach depicted in 5A may have to be used to perform the patch, otherwise an error may occur. A JSON patch or merge may return an error unless the target object is a JSON object. Therefore, in such a situation, the methods described herein may be used (i.e., identifying a resource method to calculate the resource object using the "patch-target method" and "patch-target path" headers of FIG. 5) to find a correct target resource method to return a correct JSON object target. For example, as in FIG. 5A, a method may be provided by a user to return a JSON object in response to the "patch-target method" being GET and the "patch-target method" being "/StudentPatch/anotherviewstudents/1."

Figure 6:
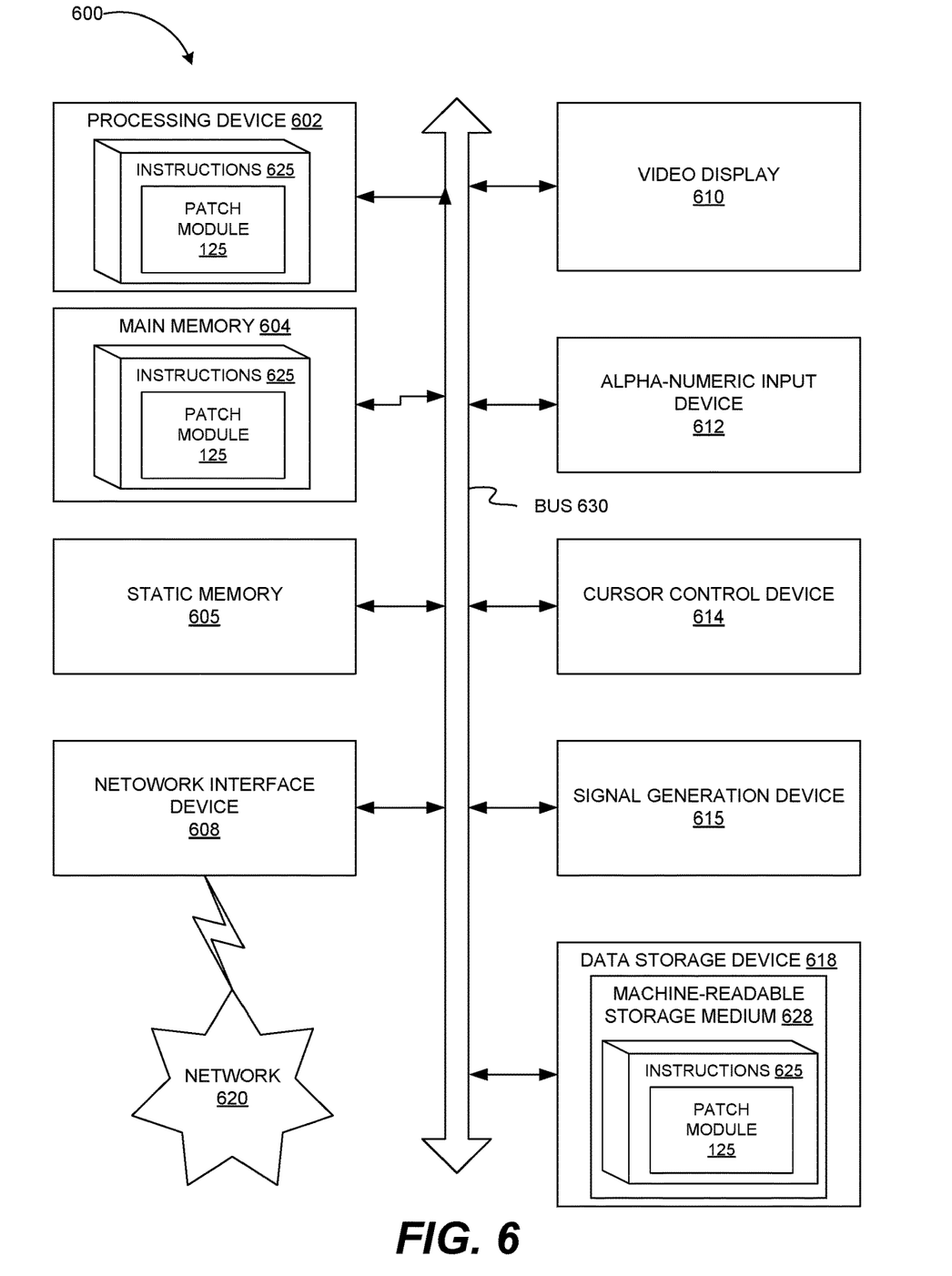
FIG. 6 is a block diagram of an example apparatus that may perform one or more of the operations described herein, in accordance with some embodiments of the present disclosure.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a networking migration controller, e.g., patch module 125, for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
    receiving, by an application server, a request to modify a target resource object stored at the application server;
    identifying, from the request, a first parameter corresponding to a patch target method and a second parameter corresponding to a path of the target resource object;
    assigning the first parameter to a first variable and the second parameter to a second variable;
    selecting a resource function of the application server in view of the first variable and the second variable; and
    executing, by a processing device of the application server, the resource function to calculate a location of the target resource object at the application server in view of the first and second variables.

2. The method of claim 1, further comprising:
    modifying the target resource object in view of the request, wherein the request comprises an http request to patch a JSON file, a string object, or an XML file.

3. The method of claim 1, wherein identifying the first parameter comprises:
    determining whether the request includes a patch function; and
    in response to determining that the request includes the patch function, assigning the patch function to the first variable.

4. The method of claim 3, wherein identifying the first parameter further comprises:
    in response to determining that the request does not include the patch function, assigning a default patch function to the first variable.

5. The method of claim 1, wherein identifying the second parameter comprises:
    determining whether the request includes a target path for the target resource object; and
    in response to determining that the request includes the target path, assigning the target path to the second variable.

6. The method of claim 5, wherein identifying the second parameter further comprises:
    in response to determining that the request does not include the target path, determining whether a micro-profile configuration includes the target path; and
    in response to determining that the micro-profile configuration includes the target path, assigning the target path to the second variable.

7. The method of claim 6, wherein identifying the second parameter further comprises:
    in response to determining that neither the request or the micro-profile configuration includes the target path, assigning a URL of the request to the second variable.

8. The method of claim 1, wherein the resource function is selected from a resource object class in view of the first variable and the second variable.

9. A system comprising:
    a memory; and
    a processing device operatively coupled to the memory, the processing device to:
        receive, from a client device, a request to modify a target resource object stored at an application server;
        identify, from the request, a first parameter corresponding to a patch target method and a second parameter corresponding to a path of the target resource object;
        assign the first parameter to a first variable and the second parameter to a second variable;
        select a resource function of the application server in view of the first variable and the second variable; and
        execute the resource function to calculate a location of the target resource object at the application server in view of the first and second variables.

10. The system of claim 9, wherein the processing device is further to:
    modify the target resource object in view of the request, where the request comprises an http request to patch a JSON file, a string object, or an XML file.

11. The system of claim 9, wherein to identify the first parameter, the processing device is to:
    determine whether the request includes a patch function; and
    in response to determining that the request includes the patch function, assign the patch function to the first variable.

12. The system of claim 11, wherein to identify the first parameter, the processing device is further to:
    in response to determining that the request does not include the patch function, assign a default patch function to the first variable.

13. The system of claim 9, wherein to identify the second parameter, the processing device is to:
    determine whether the request includes a target path for the target resource object; and
    in response to determining that the request includes the target path, assign the target path to the second variable.

14. The system of claim 13, wherein to identify the second parameter, the processing device is further to:

in response to determining that the request does not include the target path, determine whether a micro-profile configuration includes the target path; and in response to determining that the micro-profile configuration includes the target path, assign the target path to the second variable.

15. The system of claim 14, wherein to identify the second parameter, the processing device is further to:

in response to determining that neither the request or the micro-profile configuration includes the target path, assign a URL of the request to the second variable.

16. The system of claim 9, wherein the resource function is selected from a resource object class in view of the first variable and the second variable.

17. A non-transitory computer-readable storage medium including instructions that, when executed by a processing device, cause the processing device to:

receive, from a client device, a request to modify a target resource object stored at an application server;

identify, from the request, a first parameter corresponding to a patch target method and a second parameter corresponding to a path of the target resource object;

assign the first parameter to a first variable and the second parameter to a second variable;

select a resource function of the application server in view of the first variable and the second variable;

execute, by the processing device, the resource function to calculate a location of the target resource object at the application server in view of the first and second variables; and modify the target resource object in view of the request.

18. The non-transitory computer-readable storage medium of claim 17, wherein to identify the first parameter, the processing device is to:

determine whether the request includes a patch function; and in response to determining that the request includes the patch function, assign the patch function to the first variable.

19. The non-transitory computer-readable storage medium of claim 18, wherein to identify the first parameter, the processing device is further to:

in response to determining that the request does not include the patch function, assign a default patch function to the first variable.

20. The non-transitory computer-readable storage medium of claim 17, wherein to identify the second parameter, the processing device is to:

determine whether the request includes a target path for the target resource object; and in response to determining that the request includes the target path, assign the target path to the second variable.

* * * * *